(No Model.)
C. L. SHAW.
Flood Gate.
No. 234,338. Patented Nov. 9, 1880.
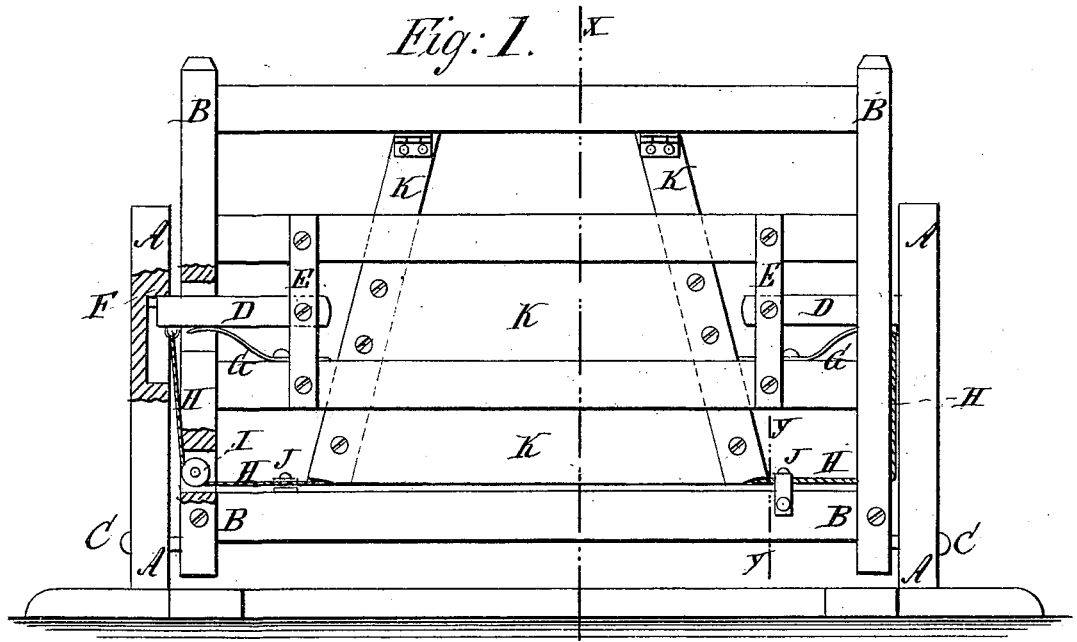
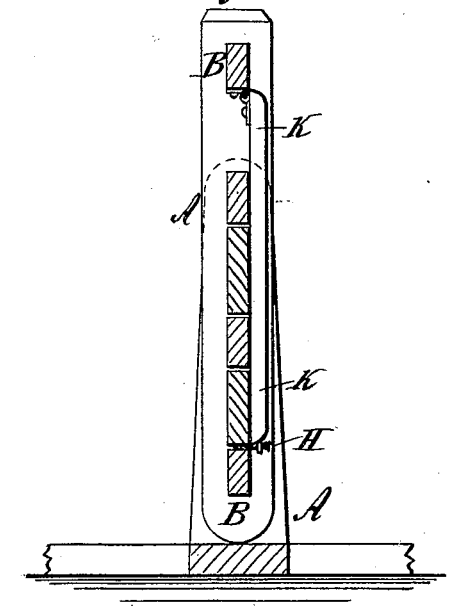
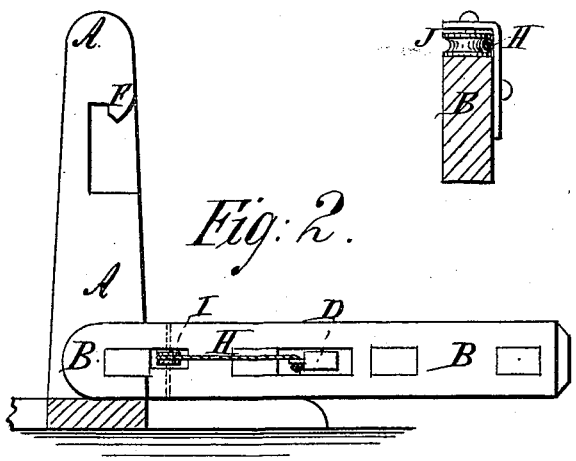
WITNESSES:
A. Schehl.
B. G. Underwood.
INVENTOR:
C. L. Shaw,
BY Munn & Co
ATTORNEYS.
N. PETERS, PHOTO-LITHOGRAPHER, WASHINGTON, D. C.

UNITED STATES PATENT OFFICE.

CHARLES L. SHAW, OF NORA, ILLINOIS.

FLOOD-GATE.

SPECIFICATION forming part of Letters Patent No. 234,338, dated November 9, 1880.

Application filed August 24, 1880. (No model.)

*To all whom it may concern:*

Be it known that I, CHARLES LESLIE SHAW, of Nora, in the county of Jo Daviess and State of Illinois, have invented a new and useful Improvement in Flood-Gates, of which the following is a specification.

Figure 1 is a front elevation of the improvement. Fig. 2 is an end view, showing gate lowered and with one of the posts removed. Fig. 3 is a sectional end elevation taken through the line $x\ x$, Fig. 1. Fig. 4 is a section taken through the line $y\ y$, Fig. 1.

The object of this invention is to furnish flood-gates for streams, hollows, and lowlands liable to be overflowed by a sudden rise of water, and which shall be so constructed that they will not wash away, and will allow the water and any rubbish being carried down by the water to pass freely.

The invention consists in constructing a flood-gate of posts having catches, a gate hinged at its lower corners to the posts, and having spring-latches to engage with the catches of the posts, a wide wing or lever, hinged at its upper edge to the gate, and connected at its lower corners with the spring-latches of the gate by ropes or chains passing around guide-pulleys, whereby the pressure of the water as it rises will unlatch the gate and allow it to swing down to the ground in a horizontal position, as will be hereinafter fully described.

A represents the posts, which are set in the ground at the opposite sides of the stream, or at suitable distances apart. B is the gate, which is formed by attaching cross-bars to the ends of horizontal boards, or in any other desired manner. The gate B is hinged at its lower corners to the lower parts of the posts A by pins C, bolts, or other suitable hinges.

D are latches, which are hinged at their inner ends to short bars, E, attached to the horizontal boards of the gate B. The latches D pass through slots or openings in the end bars of the gate B, and project so as to engage with catches F formed in or attached to the posts A, which catches F are so formed that the projecting ends of the latches D move upward to engage with the catches F and move downward to be unlatched. The outer ends of the latches D are held up to engage with the catches F by springs G, of any suitable form, interposed between the said latches and the edge of the horizontal board next to them.

To the outer parts of the latches D are attached the ends of cords or chains H, which pass down between the ends of the gate B and the posts A, pass around pulleys I, pivoted in slots or openings in the lower parts of the end bars of the gate B, around pulleys J, pivoted to supports attached to the lower board of the gate B, and their other ends are attached to the lower corners of the wide or fan-shaped wing or lever K. The lever K is hinged at its upper edge to the top board of the gate B, and is formed by attaching the ends of horizontal boards to cross-bars, the horizontal boards being so arranged as to come between the horizontal boards of the gate B. With this construction, when the water rises it strikes against the lower horizontal boards of the wing or lever K and forces the lower part of the said wing or lever outward. This outward movement of the lower end of the wing or lever K draws upon the ropes or chains H and draws the latches D downward, unlatching the gate. As the gate is unlatched the force of the water forces it down to the ground in a horizontal position, so that the water and any rubbish that may be floating in the water can pass over the gate unobstructed, and that the gate will not be injured, and can be again raised into its place as soon as the water has subsided.

With this construction it will not be necessary for the farmer, after each freshet, to repair his flood-gates and fences or make new ones to replace those injured or swept away by the high water.

Having thus described my invention, I claim as new and desire to secure by Letters Patent—

1. A flood-gate constructed substantially as herein shown and described, consisting of the posts A, having catches F, the gate B, hinged at its lower corners, the latches D, the springs G, the ropes or chains H, the guide-pulleys I J, and the wide lever K, hinged at its upper edge, as set forth.

2. In a flood-gate, the combination, with the posts A, having catches F, and the gate B, hinged at its lower corners and having spring-latches D G, of the wide lever K, hinged at its upper edge and connected with the latches D by cords or chains H, substantially as herein shown and described, whereby the pressure of the water will unlatch the gate B and allow the gate to swing down to the ground in a horizontal position, as set forth.

CHARLES LESLIE SHAW.

Witnesses:
WALTER STICKNEY,
ROBERT M. WILSON.